United States Patent [19]
Stidham

[11] Patent Number: 5,473,839
[45] Date of Patent: Dec. 12, 1995

[54] TREE SUPPORT

[76] Inventor: Jay D. Stidham, 2325 W. Orange Rd., Waterloo, Iowa 50701

[21] Appl. No.: 248,401

[22] Filed: May 24, 1994

[51] Int. Cl.⁶ .......................... A01G 17/06; A01G 17/14
[52] U.S. Cl. .................... 47/47; 47/45; 248/156
[58] Field of Search ............ 47/47, 47 R, 47 F, 47/47 L, 47 S, 45 R, 45 C; 248/27.8, 156

[56] References Cited

U.S. PATENT DOCUMENTS

| | | | |
|---|---|---|---|
| 1,676,337 | 7/1928 | Kruse | 47/45 C |
| 2,554,887 | 5/1951 | Tricarico | 248/156 |
| 3,136,510 | 6/1964 | Bowers et al. | 47/47 L |
| 4,913,389 | 4/1990 | McCracken | 248/156 |
| 5,065,975 | 11/1991 | Giles | 248/156 |

FOREIGN PATENT DOCUMENTS

| | | | |
|---|---|---|---|
| 277951 | 7/1963 | Australia | 47/47 |
| 1582856 | 9/1969 | Germany | 47/47 R |
| 2539079 | 3/1977 | Germany | 248/156 |
| 311103 | 1/1956 | Switzerland | 47/47 L |
| 676905 | 3/1991 | Switzerland | 47/47 R |
| 13272 | of 1914 | United Kingdom | 47/47 R |

*Primary Examiner*—Ramon S. Britts
*Assistant Examiner*—Joanne C. Downs
*Attorney, Agent, or Firm*—Allan L. Harms

[57] ABSTRACT

A support for a tree or shrub includes a vertical post with a supporting frame welded to the post. The frame includes horizontal sides which have downwardly depending stakes fixed to them. The support may be placed near a tree or shrub so that the sides of the frame surround the tree or shrub. The stakes and post are driven into the ground to a point where the frame abuts the ground. Loops on the post are available to connect supporting cords or wires from the tree trunk or bush stem.

5 Claims, 1 Drawing Sheet

TREE SUPPORT

BACKGROUND OF THE INVENTION

The present invention pertains to devices and methods for supporting young, damaged, or newly planted trees and shrubs. The typical method and equipment for supporting trees and shrubs is by use of a post embedded in the ground a small distance from the tree or shrub, with wires or cords tied around the post and running in a generally horizontal orientation to the trunk or main stem of the tree or shrub.

Another means for supporting a fragile tree or shrub is by use of posts arranged on opposing sides of the tree or shrub, with cords or wires connecting the tree trunk or shrub stem to both posts.

Another method for supporting a sapling or young evergreen is through the use of short stakes driven into the ground around the base of the tree or shrub, with cords or wires running angularly to the tree trunk or shrub stem, interconnecting the mid or upper portion of the trunk or stem to the stakes. A refinement of this method is provided by the use of metal pins having hooks formed on their upper ends such that cords or elastic ropes may be connected to the hooks on the pins and interconnected to the tree's trunk at a distance above the ground. The pins may be driven into the earth such that the upper ends of each pin which form the hook are generally flush with the ground surface.

In each of the known methods and devices, some obstruction remains at ground level near the tree or shrub, which makes it difficult to trim grass or other vegetation close to the tree or shrub. In addition, especially in the case of the use of a single post as in the typical method, windy conditions may cause the tree or shrub to dislodge or bend the post over, leading to the need to repair the supporting structure and to straighten or replace the tree or shrub.

Also, in the case of use of a post such as an ordinary fence post, the wire or rope leading to the tree must be tied around the post because no means is provided to connect the wire or cord to the post.

SUMMARY OF THE INVENTION

According to the present invention, a tree support is provided which comprises an upright post member fixed to supporting legs Which are mounted to the post such that when the post is driven into the ground near a tree or shrub needing support, the support members come into abutment with the ground surface. Rings or loops are fixed along the length of the post member to provide attachment points for connection of cords or wires which are interconnected between the post member and the tree trunk or shrub stem. The supporting legs comprise a frame having a plurality of sides terminating in downwardly directed stake members, the frame being fixed by welding or other permanent means to the post at a central portion thereof. The sides are disposed on either side of the tree or shrub to be supported before the stake members are driven into the ground.

Accordingly, it is an object of the invention to provide a tree support which is itself supported against bending forces applied to the tree support and the tree or shrub it is supporting.

Another object is to provide a tree support which provides minimal ground obstruction to mowing or trimming of grass or other vegetation.

Another object of the invention is to provide a tree support with simple means for attaching cords or wires to the tree support.

Another object of the invention is to provide a tree support having increased strength and stability against dislodgment from an upright position.

These and other objects will be apparent from a review of the detailed description which follows.

DESCRIPTION OF THE DRAWING FIGURES

DETAILED DESCRIPTION OF THE INVENTION

Figure 1:
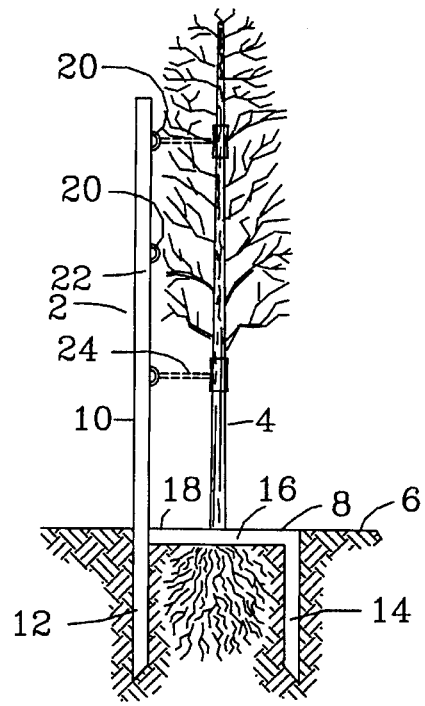
FIG. 1 is a front elevation of the preferred embodiment of the invention installed in the ground and in place to support a tree sapling.

Referring to FIG. 1 of the drawing figures, the invention 2 is illustrated in position to support a tree sapling 4 which has been planted in ground 6. Invention 2 is positioned spacially separated from tree sapling 4 and the supporting frame 8 of invention 2 is placed in ground 6 such that stake member 14 is generally vertically secured in ground 6 while frame leg 16 is abutted upon the ground 6. Top surface 18 of leg 16 is generally coplanar with the top surface of ground 6 and lower section 12 of post 10 is secured in ground 6 when invention 2 is installed for use.

Loops 20 are provided along upper section 22 of post 10 providing securing means for cord, string or wire 24 which is retained to tree 4 on one end and to invention 2 on the other.

Figure 2:
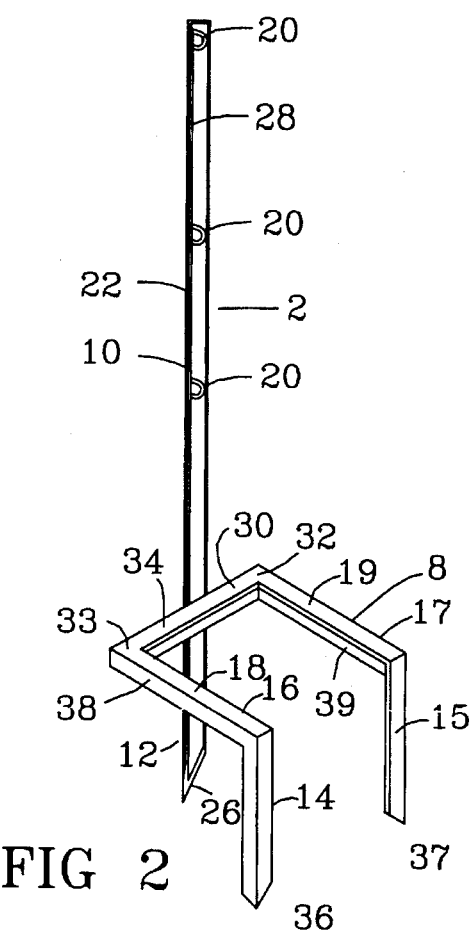
FIG. 2 is a left front perspective view of the preferred embodiment of the invention.

Further detail of the structure of invention 2 can be visualized by reference to FIG. 2 where invention 2 is shown in a perspective view. Invention 2 can be seen to comprise an upright post 10 having an upper section 22 and a lower section 12 which terminates in sharpened terminus 26. It can be seen that post 10 of the preferred embodiment is an angle member but post 10 may easily be constructed of other common structural components including fence posts having a T-shaped cross section. It is found however that the cost of manufacturing is kept at a minimum through use of angle stock for the post 10 and frame 8 of the invention 2.

It can be seen that post 10 is provided with a plurality of loop members 20 along the length of upper section 22 of post 10. In,the preferred embodiment, loops 20 number three though it can be seen that the invention 2 would be functional with at least one loop 20. Loops 20 are fixed to the inside corner 28 of post 10 by welding or other securing means. Loops 20 may be substituted with other hook means which are capable of retaining an end of a cord, string or wire.

Frame 8 is secured by welding or other means to post 10 at a point which divides post 10 into upper section 22 and lower section 12 thereof. In the preferred embodiment of FIG. 2, frame 8 comprises a transverse arm 30 which is secured along its length to post 10 by welding or other permanent means. Legs 16 and 17 are joined substantially perpendicularly to the opposing ends 32 and 33 of transverse arm 30 such that the upper surface 18 of first side element 16 and the upper surface 19 of second side element 17 are generally coplanar with the upper surface 34 of transverse arm 30. Upper surfaces 18, 19, and 34 lie in a plane which is substantially perpendicular to the axis of post 10. Joined to legs 16 and 17 are stake members 14 and 15 respectively, which depend downwardly such that they are substantially parallel to lower section 12 of post 10. Each of stake members 14 and 15 terminates in a sharpened end, points 36 and 37 respectively. The points 36 and 37 and terminus 26 of post 10 are provided to ease penetration of soil when invention 2 is installed.

It can be seen that post 10 and the elements of frame 8 are all constructed of metal angle stock. However, other materials and configurations thereof are contemplated by this disclosure. The use of angle stock allows vertical sides 38 and 39 of legs 16 and 17 respectively, to penetrate the surface of the soil where invention is placed, such that upper surface 18 of leg 16, for example, is near the surface of the soil, thereby permitting mowing or trimming close to invention 2 and to the tree or shrub it supports, without interference from vertical obstructions such as ground stakes or angular wires or cords interconnecting the tree and the supporting stakes.

It is also to be noted that frame 8 and stake members 14 and 15 may be constructed of continuous angle stock material, such that the angle may be notched and bent in well known fashion to form transverse arm 30, legs 16 and 17, and stake members 14 and 15. Of course other stock bar material may similarly be formed into these members if used in place of angle stock.

Figure 3:
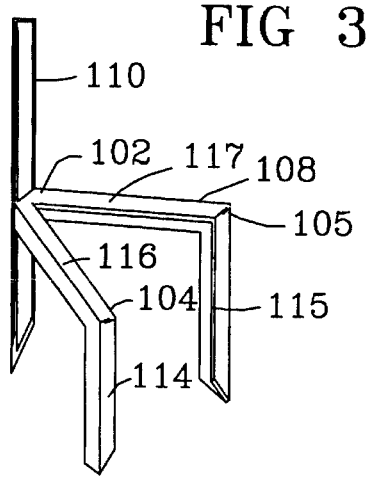
FIG. 3 is a left front perspective view of the lower section of an alternative embodiment of the invention illustrating a modified configuration of the supporting frame of the embodiment.

An alternative embodiment of the invention is disclosed in FIG. 3 where a vertical post 110 is fixed to a substantially triangularly configured frame 108 at corner 102 thereof. Legs 116 and 117 are joined at corner 102 and have vertical stakes 114 and 115 joined at the free ends 104 and 105 thereof.

Figure 4:
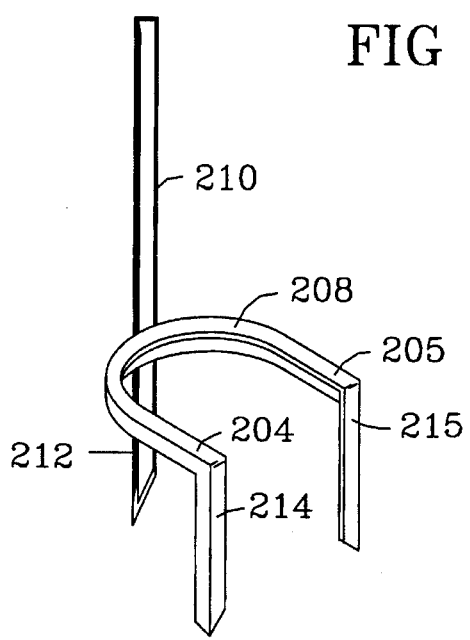
FIG. 4 is a left front perspective view of the lower section of another alternative embodiment of the invention illustrating another modified configuration of the supporting frame of the embodiment.

Another alternative embodiment of the invention is illustrated in FIG. 4 wherein a curved frame element 208 is joined to a vertical post 210 generally at the midpoint of curved frame element 108. Stake members 214 and 215 depend respectively from the opposing ends 204 and 205 of curved frame element 208 such that stake members 214 and 215 are generally parallel to lower section 212 of vertical post 210. Curved frame element 208 lies in a plane which is substantially perpendicular to the axis of vertical post 210.

OPERATION OF THE INVENTION

After a tree or shrub is planted, the invention 2 may be located adjacent the tree or shrub, with legs 16 and 17 of invention 2 disposed such that the tree or shrub is located between them. Post 10 and stake members 14 and 15 are driven into the earth such that legs 16 and 17 rest upon the surface of the earth on either side of the tree or shrub. Cords, wires, elastic ropes or other interconnecting means are fastened to loops 20 and to the trunk of the tree or main stem of the shrub such that invention 2 provides support for the tree or shrub against winds or other lateral forces. Because legs 16 and 17 are adjacent the ground surface, little obstruction is presented to grass mowing or trimming.

Having described the invention, I claim:

1. A support for trees, shrubs or bushes, comprising an upright elongate post having a lower end engageable with the earth, said post having an upper section provided with a plurality of loops fixed therealong, said post having a frame depending generally perpendicularly therefrom, said frame having at least two legs downwardly depending therefrom, each of said legs depending perpendicularly from the frame, said post being substantially longer than any of said at least two legs, said post and said legs comprising metal angle stock material.

2. Apparatus to provide support for a tree or shrub, comprising an elongate post having a lower section and an upper section, said upper section having at least one loop mounted along the length thereof, a frame fixed to the post between the lower section and the upper section thereof, the frame having at least two stake members depending downwardly therefrom, said post being substantially longer than any of said at least two stake members, said post having two longitudinal sides joined at a right angle, said at least one loop mounted in said angle.

3. Apparatus to provide support for a tree or shrub, comprising an elongate post having a lower section and an upper section, said upper section having at least one loop mounted along the length thereof, a frame fixed to the post between the lower section and the upper section thereof, the frame having at least two stake members depending downwardly therefrom, said post being substantially longer than any of said at least two stake members, the frame having a plurality of sides, said plurality of sides comprising a transverse arm having opposing ends thereon and leg members generally perpendicularly fixed to said ends, said transverse arm fixed to said post, said stake members depending from said leg members, said transverse arm and said leg members defining a plane perpendicular to the axis of said post, said stake members having tapered free ends thereon, said post having a lower end, said lower end terminating in a tapered point, said free ends of said state members and said tapered point of said post lying in an imaginary plane perpendicular to the axis of said post, said at least one loop being a rigid loop.

4. The apparatus of claim 3 wherein the stake members have axes which are generally parallel to the axis of said post.

5. Unitary apparatus to support a tree, bush, or shrub comprising an elongate upright post having a lower end and an upper end, said post having an open frame fixed thereto between said upper end and said lower end of said post, said frame defining a plane substantially perpendicular to the axis of said post, said frame having ends thereon, a downwardly extending stake fixed to each end of said frame, each stake having a pointed free end thereon, each stake being of length substantially equal to the length of said lower end of said post, said post having at least one rigid loop element fixed along the upper end thereof, said frame having a plurality of sides, said plurality of sides comprising a transverse arm having opposing ends thereon and lateral arms generally perpendicularly fixed to said ends of said transverse arm, said transverse arm fixed to said post, said stakes depending from said lateral arms, said transverse arm and said lateral arms defining a plane perpendicular to the axis of said post, said stakes having tapered free ends thereon, said lower end of said post terminating in a tapered point, said free ends of said stakes and said tapered point of said post lying in an imaginary plane perpendicular to the axis of said post, each of said post, said transverse arm, said lateral arms, and said stakes having two longitudinal sides joined at a right angle, one of said two longitudinal sides of each of said transverse arm and said lateral arms disposed downwardly.

* * * * *